(12) United States Patent
Labbé

(10) Patent No.: US 7,927,241 B2
(45) Date of Patent: Apr. 19, 2011

(54) DRIVEN PULLEY FOR A CONTINUOUSLY VARIABLE TRANSMISSION

(75) Inventor: Jocelyn Labbé, Saint-Germain-de-Grantham (CA)

(73) Assignee: Cvtech R & D Inc., Drummondville, Quebec (CA)

( * ) Notice: Subject to any disclaimer, the term of this patent is extended or adjusted under 35 U.S.C. 154(b) by 68 days.

(21) Appl. No.: 12/256,559

(22) Filed: Oct. 23, 2008

(65) Prior Publication Data

US 2009/0048046 A1 Feb. 19, 2009

Related U.S. Application Data

(63) Continuation of application No. PCT/CA2007/000767, filed on May 2, 2007.

(60) Provisional application No. 60/746,221, filed on May 2, 2006.

(51) Int. Cl.
*F16H 59/00* (2006.01)
*F16H 61/00* (2006.01)
*F16H 63/00* (2006.01)
*F16H 55/56* (2006.01)
*F16H 55/36* (2006.01)

(52) U.S. Cl. .............. 474/19; 474/10; 474/12

(58) Field of Classification Search ............ 474/10, 474/12, 14, 19, 46
See application file for complete search history.

(56) References Cited

U.S. PATENT DOCUMENTS

| | | | | |
|---|---|---|---|---|
| 584,301 A * | 6/1897 | Baxter | ............ | 192/16 |
| 1,684,069 A * | 9/1928 | Pennington | ............ | 474/19 |
| 1,911,171 A * | 5/1933 | Bernhard | ............ | 384/549 |
| 2,092,469 A * | 9/1937 | Oslund | ............ | 474/19 |
| 2,220,711 A * | 11/1940 | Fitch | ............ | 173/93.6 |
| 2,530,796 A * | 11/1950 | Weyant | ............ | 192/54.52 |
| 2,952,161 A * | 9/1960 | Williams | ............ | 474/19 |
| 2,987,934 A * | 6/1961 | Thomas | ............ | 474/12 |
| 3,190,135 A * | 6/1965 | Berens | ............ | 474/19 |
| 3,224,287 A * | 12/1965 | Gesche et al. | ............ | 474/19 |
| 3,365,967 A * | 1/1968 | Moogk | ............ | 474/19 |
| 3,429,193 A * | 2/1969 | Steuer | ............ | 474/19 |
| 3,628,389 A * | 12/1971 | Wiegelmann et al. | ............ | 474/19 |
| 3,652,028 A * | 3/1972 | Ukai et al. | ............ | 242/129 |
| 3,722,308 A * | 3/1973 | Steuer | ............ | 474/19 |
| 3,861,228 A * | 1/1975 | Adams | ............ | 474/19 |
| 4,006,943 A * | 2/1977 | Gibble et al. | ............ | 384/381 |
| 4,010,527 A * | 3/1977 | Swanson | ............ | 19/295 |
| 4,054,964 A * | 10/1977 | Kaneko | ............ | 16/20 |
| 4,173,155 A * | 11/1979 | Togami et al. | ............ | 474/19 |
| 4,714,451 A * | 12/1987 | Yoshida et al. | ............ | 474/28 |
| 4,876,044 A * | 10/1989 | Cebalo et al. | ............ | 504/217 |
| 5,127,374 A * | 7/1992 | Morel et al. | ............ | 123/90.35 |
| 5,516,333 A * | 5/1996 | Benson | ............ | 474/19 |
| 5,537,120 A * | 7/1996 | Willmore | ............ | 342/15 |
| 5,538,120 A * | 7/1996 | Berardicurti | ............ | 192/54.52 |
| 5,720,681 A * | 2/1998 | Benson | ............ | 474/10 |
| 5,967,286 A * | 10/1999 | Hokanson et al. | ............ | 192/110 R |
| 6,095,937 A * | 8/2000 | Aaen | ............ | 474/10 |
| 6,120,399 A * | 9/2000 | Okeson et al. | ............ | 474/14 |

(Continued)

*Primary Examiner* — Michael R Mansen
*Assistant Examiner* — Henry Liu
(74) *Attorney, Agent, or Firm* — Ipaxio S.E.N.C.

(57) ABSTRACT

The driven pulley (10) comprises a first sheave (12) and a second sheave (40) coaxially mounted around a main shaft. The first sheave (12) is fixed with reference to the main shaft while the other sheave (40) is allowed to slide and rotate with reference to the main shaft. The driven pulley (10) is designed with a roller mounting unit (74) facilitating the assembling or the replacement of the rollers (70).

10 Claims, 4 Drawing Sheets

U.S. PATENT DOCUMENTS

| | | | |
|---|---|---|---|
| 6,146,295 A * | 11/2000 | Mor et al. | 474/13 |
| 6,379,274 B1 * | 4/2002 | Robert | 474/19 |
| 6,569,043 B2 * | 5/2003 | Younggren et al. | 474/19 |
| 6,743,129 B1 * | 6/2004 | Younggren et al. | 474/19 |
| 6,758,775 B2 * | 7/2004 | Heinrich et al. | 474/19 |
| 6,837,353 B2 * | 1/2005 | Watt | 192/54.52 |
| 6,949,039 B2 * | 9/2005 | Labbe | 474/19 |
| 6,953,400 B2 * | 10/2005 | Kalies | 472/10 |
| 6,994,643 B2 * | 2/2006 | Kalies | 474/46 |
| 6,997,833 B2 * | 2/2006 | Labbe | 474/19 |
| 7,037,226 B2 * | 5/2006 | Zulawski | 474/19 |
| 7,044,872 B1 * | 5/2006 | Johnson | 474/14 |
| 7,179,183 B2 * | 2/2007 | Borghi | 474/19 |
| 2003/0019322 A1 * | 1/2003 | Lee | 74/567 |
| 2004/0142781 A1 * | 7/2004 | Huddleston | 474/19 |

* cited by examiner

DRIVEN PULLEY FOR A CONTINUOUSLY VARIABLE TRANSMISSION

RELATED APPLICATIONS

This application is a continuation of International Patent Application No. PCT/CA2007/000767 filed on May 2, 2007 designating the United States of America, which PCT Application claims benefit of U.S. Provisional Patent Application No. 60/746,221 filed on May 2, 2006, all of which are hereby incorporated by reference.

BACKGROUND

Continuously variable transmissions (CVTs) are commonly used on a wide range of vehicles, such as small cars or trucks, snowmobiles, golf carts, scooters, etc. They typically comprise a driving pulley mechanically connected to a motor, a driven pulley mechanically connected to wheels or a track, possibly through another mechanical device such as a gear box, and a trapezoidal drivebelt transmitting torque between the driving pulley and the driven pulley. A CVT automatically changes the ratio as required by load and speed conditions, providing an increased torque under high loads at low speeds and yet controlling the rotation speed of the motor as the vehicle accelerates. A CVT may be used with all kinds of motors, such as internal combustion engines or electric motors.

The sides of the drivebelt are, on each pulley, gripped between two opposite sheaves that are coaxially mounted around a corresponding main shaft. Generally, in each pulley of a conventional CVT, one sheave, usually called "fixed sheave", is rigidly connected to one end of the corresponding main shaft. The other sheave, usually called "movable sheave", is free to slide and/or rotate with reference to the fixed sheave by means of bushings or the like.

At a low vehicle speed, the winding diameter of the drivebelt at the driving pulley is minimal and the winding diameter of the driven pulley is maximum. This is referred to as the minimum ratio since there is the minimum number of rotations or fraction of rotation of the driven pulley for each full rotation of the driving pulley.

Generally, when the rotation speed of the driving pulley increases, its movable sheave moves closer to the fixed sheave thereof under the effect of a centrifugal mechanism. This forces the drivebelt to wind on a larger diameter on the driving pulley and, consequently, on a smaller diameter on the driven pulley. The drivebelt then exerts a radial force on the sheaves of the driven pulley in addition to the tangential driving force by which the torque is transmitted. This radial force urges the movable sheave of the driven pulley away from the fixed sheave thereof. It is counterbalanced in part by a return force, which is typically generated by a spring inside the driven pulley or another biasing mechanism. It is also counterbalanced by a force generated by the axial reaction of the torque applied by the drivebelt on the driven pulley. This is caused by a cam system that tends to move the movable sheave towards the fixed sheave as the torque increases. The cam system typically comprises a cam plate having a plurality of symmetrically-disposed and inclined ramps on which respective cam followers are engaged. The followers are usually sliding buttons or rollers. The set of ramps or the set of followers is mounted on the movable sheave and the other is directly or indirectly connected to the main shaft in a rigid manner. The closing effect of the cam system on the drivebelt tension is then somewhat proportional to output torque.

Generally, at the maximum vehicle speed, the ratio is maximum as there is the maximum number of rotations or fraction of rotation of the driven pulley for each full rotation of the driving pulley. Then, when the vehicle speed decreases, the rotation speed of the driving pulley typically decreases as well since the rotation speed of the motor decreases. This causes, at some point, a decrease of the winding diameter of the driving pulley and a decrease of the radial force exerted by the drivebelt on the sides of the sheaves at the driven pulley. Ultimately, the driven pulley is allowed to have a larger winding diameter as the spring or another biasing mechanism moves the movable sheave back towards the fixed sheave.

Some CVTs are provided with reversible driven pulleys. A reversible driven pulley operates in a similar fashion than that of a conventional one, with the exception that the transmission ratio can be controlled during motor braking or when the vehicle is traveling in reverse. For instance, during motor braking, the torque is no longer coming from the motor to the wheels or track, but in the opposite direction. Similarly, when accelerating in reverse, the torque and the rotation will be in the reverse direction, the torque being transmitted from the motor to the wheels or track. A reversible driven pulley generally comprises a second set of ramps and a second set of followers. In use, one set of followers and its corresponding set of ramps are used when the torque is in one direction, the other set being used for the other direction.

U.S. Pat. No. 6,949,039 shows an example of a driven pulley. The driven pulley described therein provides many advantages in terms of overall weight reduction and compactness. Nevertheless, there is still room for further improvements, including some to lower the manufacturing costs thereof.

SUMMARY

In one aspect, there is provided a driven pulley for a continuously-variable transmission (CVT), the driven pulley comprising a first sheave and a second sheave coaxially disposed and defining between them a belt-receiving groove, the first sheave having at least two ramps symmetrically-disposed with reference to the rotation axis, the second sheave having at least two rollers and corresponding mounting supports symmetrically disposed with reference to the rotation axis of the driven pulley, each roller being in engagement with a corresponding one of the ramps, the mounting supports being rigidly connected to an annular member, itself removably connected to the second sheave, the annular member being perpendicularly-oriented and coaxially-disposed with reference to the rotation axis of the driven pulley, the rollers being held in the mounting supports by corresponding axles around which they are coaxially mounted, each axle having one end inserted in a corresponding radially-oriented recess provided on a side face of the annular member facing the second sheave, and a second end supported by the corresponding mounting support.

In another aspect, there is provided a roller mounting unit for a driven pulley of a continuously-variable transmission (CVT), the roller mounting unit comprising: a plurality of rollers; a plurality of axles, one for each roller, each axle having a locking portion at one end and a roller-receiving portion; an annular member having opposite first and second side faces, the first side face having a plurality of radially-oriented recesses, one for each axle, that are symmetrically disposed around the first side face, each recess having an enlarged section adjacent to an inner periphery of the annular member; a plurality of radially-oriented mounting supports, one for each roller, that project from an outer periphery of the annular member and are in registry with a corresponding one of the recesses, each mounting support having two opposite ends between which are located a corresponding one of the rollers, one end projecting from the second side face of the annular member and the other end being configured and disposed to hold an end of one of the axles once inserted in the corresponding one of the recesses; and a plurality of fasteners to removably connect the annular member to a sheave of the driven pulley with the first side face being engaged to the sheave.

In another aspect, there is provided a method of supporting rollers in a driven pulley of a continuously-variable transmission (CVT), the method comprising: inserting rollers around corresponding axles; inserting an inner end of the axles in corresponding radially-extending recesses that are symmetrically-disposed in an annular member, the outer end of each axle being supported at the end of a corresponding mounting support radially-extending outwardly from the annular member in front of the corresponding recess; and removably fastening the annular member to the driven pulley, the axles being retained in the recesses between the annular member and the driven pulley.

BRIEF DESCRIPTION OF THE FIGURES

The improved driven pulley will now be described in the following detailed description of a preferred embodiment, made in conjunction with the accompanying figures in which.

DETAILED DESCRIPTION

Figure 1:
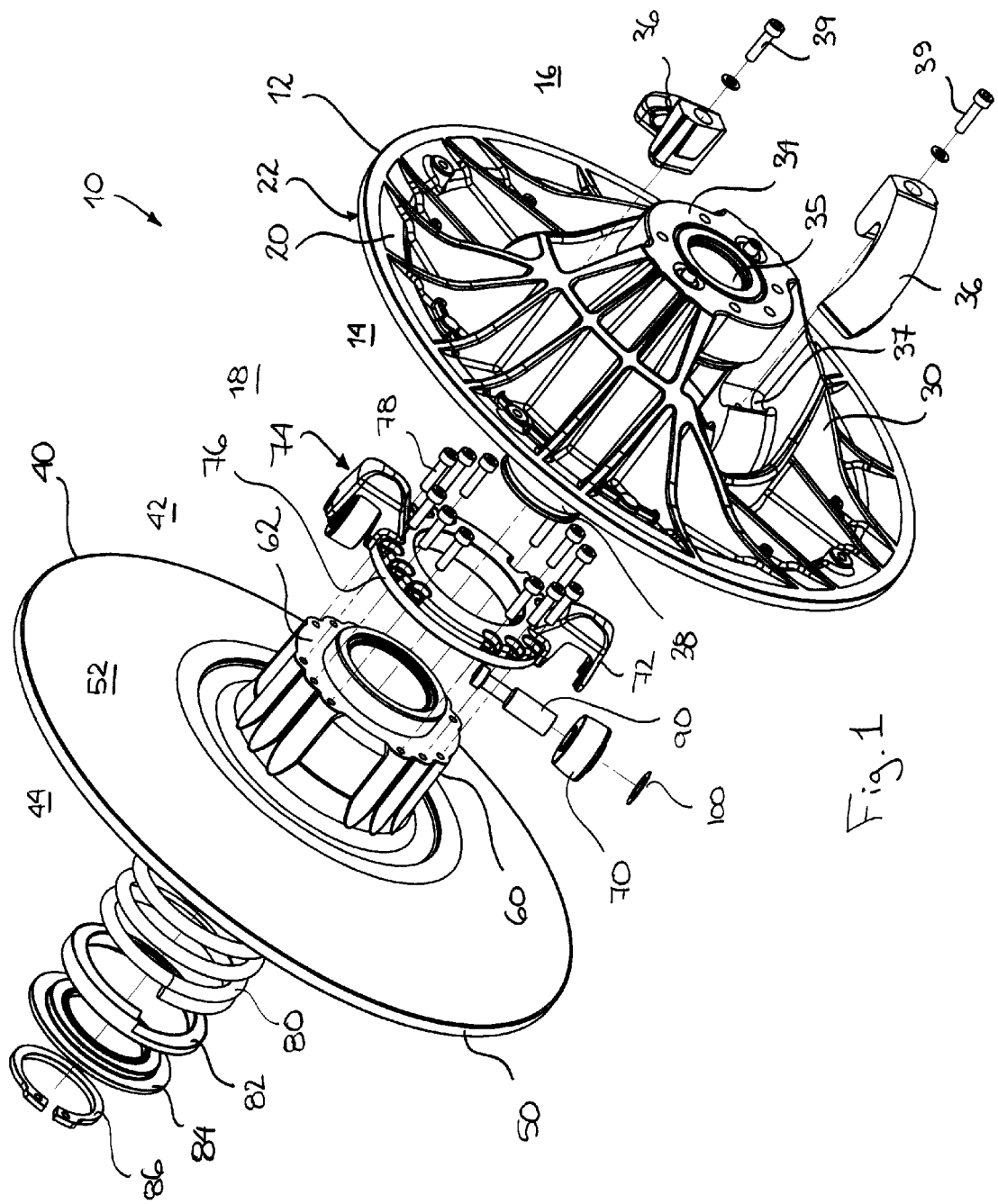
FIG. 1 is an exploded isometric view of an example of an improved driven pulley.
Figure 2:
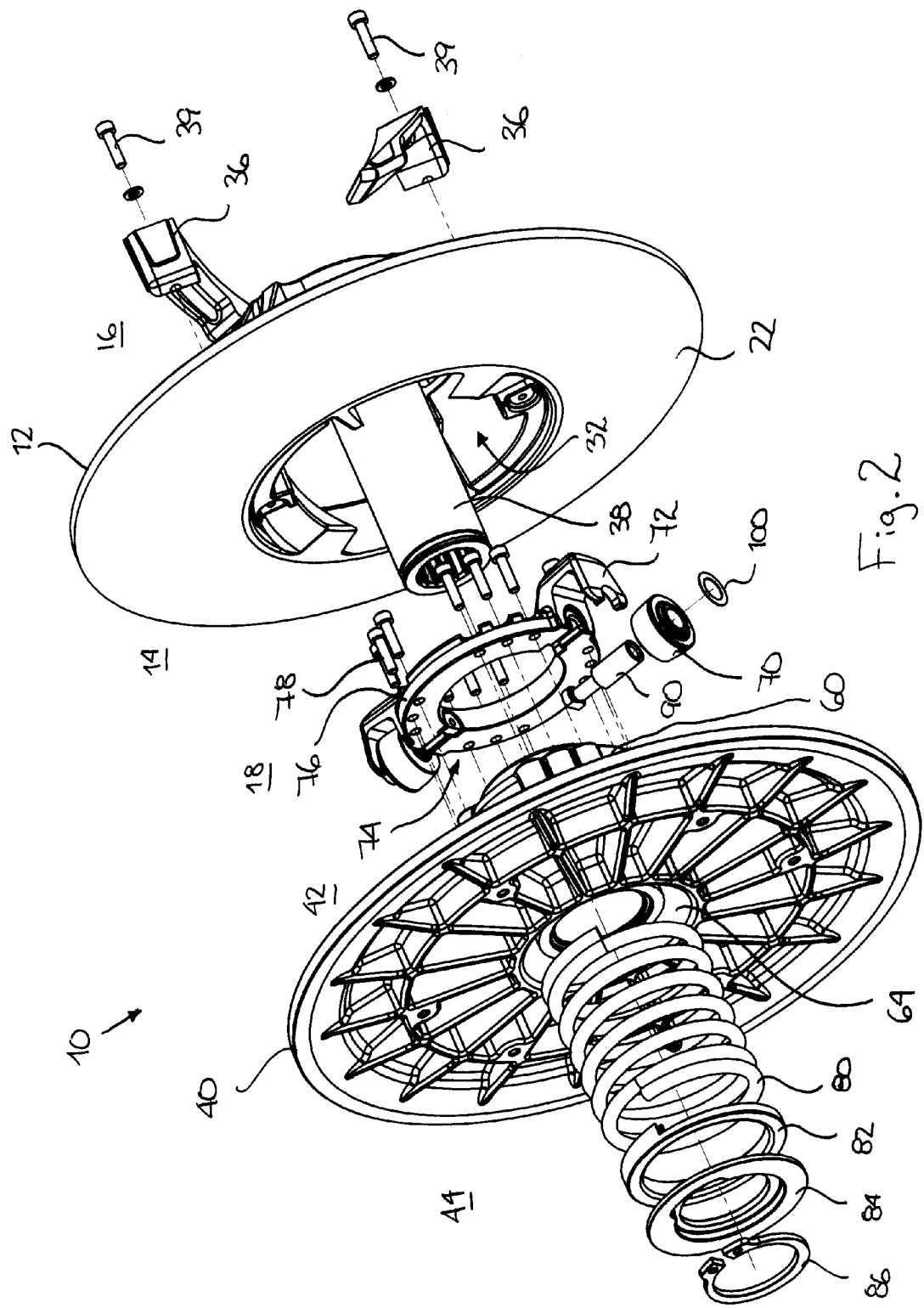
FIG. 2 is another exploded isometric view of the driven pulley shown in FIG. 1.
Figure 3:
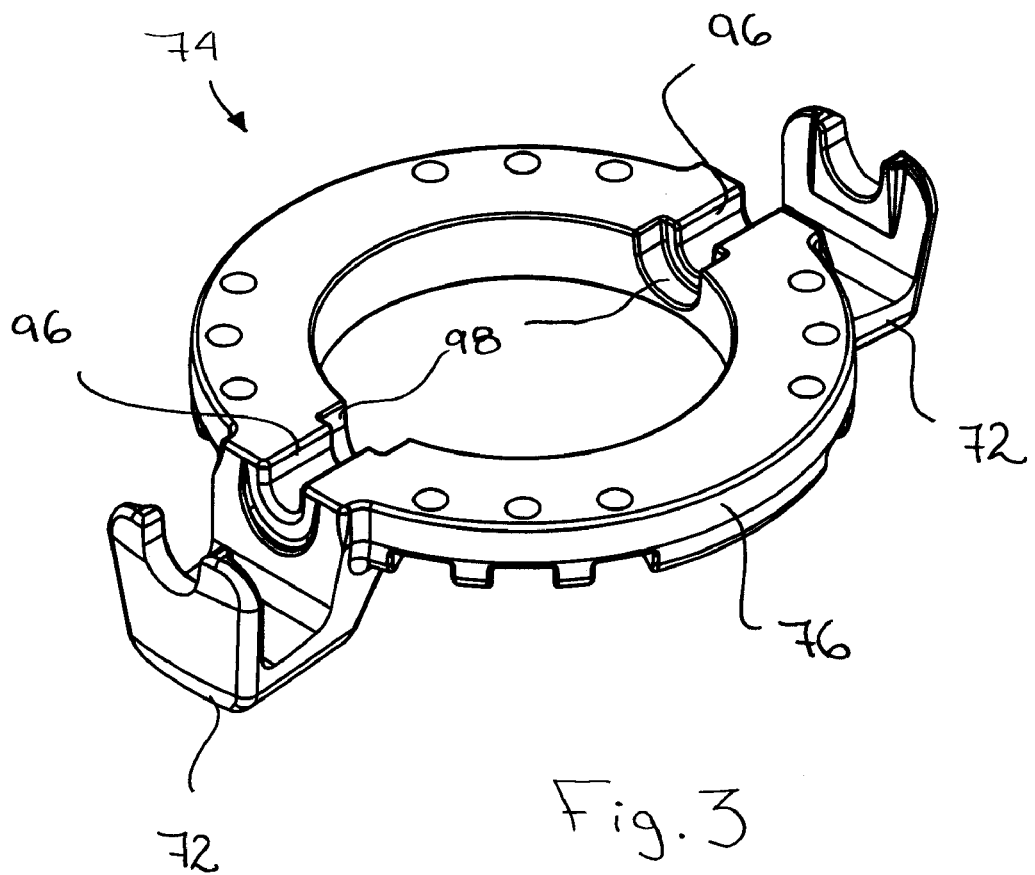
FIG. 3 is an isometric view of the underside of the roller mounting unit of the driven pulley shown in FIG. 1.

Referring to FIGS. 1 and 2, there is shown an example of a driven pulley (10) as improved herein. The driven pulley (10) is mounted on a main shaft (not shown) which defines a rotation axis. Generally, single parts of the driven pulley (10) are coaxially mounted around the rotation axis and multiples of a same part are symmetrically disposed around it in order to have a properly-balanced device, as apparent to a person skilled in art.

In use, the torque is transmitted to or from the main shaft by the driven pulley (10). This torque is supplied from or to a trapezoidal drivebelt (not shown). The trapezoidal drivebelt has one end wound on a driving pulley (not shown) and the other end wound on the driven pulley (10), more particularly around a first (12) and a second sheave (40). The torque usually goes from the driven pulley (10) to the main shaft. However, in some circumstances, the torque can be transmitted in the opposite direction.

The first sheave (12) has a first side (14) and a second side (16). It has a substantially annular and radially-extending main portion (20). The main portion (20) has a conical wall (22) provided on the first side (14) of the first sheave (12) and is designed to engage one side of the trapezoidal drivebelt.

The first sheave (12) further comprises a substantially axially-extending bracket portion (30) connected to the main portion (20) and projecting from the second side (16) of the first sheave (12). The bracket portion (30) generally defines an internal enclosure (32) opened at least at the first side (14) of the first sheave (12). As best shown in FIG. 1, the back of the bracket portion (30) of the illustrated embodiment is provided with a plurality of reinforcing ribs.

The first sheave (12) also comprises a sleeve portion (34) connected to the bracket portion (30) at a distal location with reference to the main portion (20). The sleeve portion (34) has a central hole (35) allowing the main shaft to be inserted therein. The sleeve portion (34) acts as a connection point between the driven pulley (10) and the main shaft. This allows the torque to be transmitted between them. This connection may be achieved in a number of ways. In the illustrated embodiment, the driven pulley (10) is rigidly connected to the main shaft by a mounting tube (38) which is coaxially-mounted over the main shaft. The mounting tube (38) has one end rigidly connected to the perimeter of the hole (35) of the sleeve portion (34). It also has a hollow interior in which the main shaft can be tightly inserted. Retention means, for instance a spline, a screw, internal teeth, etc. provide the torque-transmitting engagement. The mounting tube (38) can also be retained by welding, glue, etc. The length of the mounting tube (38) must be sufficient for allowing its free end to extend beyond the second sheave (40). This way, the mounting tube (38) can be used as a base for the second sheave (40) and the other parts. The driven pulley (10) can then be assembled in advance and simply fitted into place on the main shaft.

The first sheave (12) further comprises at least one or two pairs of ramps (36), depending if the driven pulley (10) is reversible or not. The ramps (36) are symmetrically-disposed with reference to the rotation axis and connected to the first sheave (12) inside the internal enclosure (32). The ramps (36) of the illustrated first sheave (12) are removable. They fit into a corresponding receptacle (37) and are connected by means of screws (39) or the like. This way, it is very easy to replace the ramps (36) and change the settings of the driven pulley (10).

The ramps (36) are to be engaged by a set of followers (70), either rollers or sliding buttons, connected to a corresponding mounting support (72).

Referring back to FIG. 1, the driven pulley (10) further comprises a second sheave (40) having a first side (42) and a second side (44). Like the first sheave (12), the second sheave (40) has a substantially annular and radially-extending main portion (50). The main portion (50) of the second sheave (40) has a conical wall (52) on its first side (42). In the illustrated embodiment, the conical wall (52) is identical to the conical wall (22) provided on the first sheave (12). Once the sheaves (12,40) are assembled, both conical walls (22, 52) face each other and form between them a belt-receiving groove (18).

Figure 5:
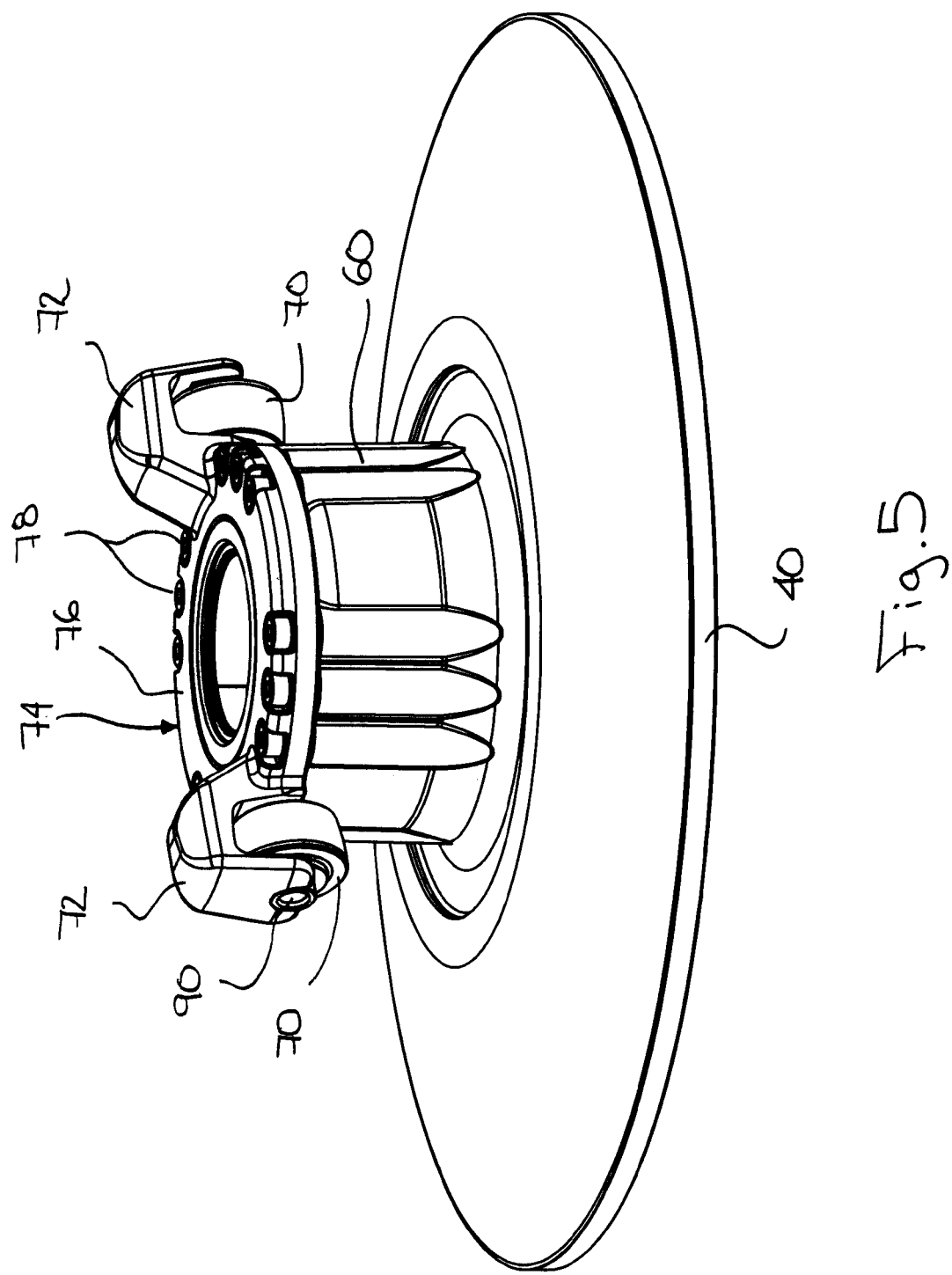
FIG. 5 is an isometric view of the second sheave with the roller mounting unit of the driven pulley of FIG. 1 when the various parts thereof are assembled together.

The second sheave (40) also comprises an outer sleeve portion (60) axially projecting from the first side (42) of the second sheave (40), as best shown in FIGS. 1 and 5. The outer sleeve portion (60) is sized to fit into the internal enclosure (32) of the first sheave (12) once the driven pulley (10) is assembled.

The driven pulley (10) comprises an axially-disposed helical spring (80) having one end resting against a fixed point at the closed bottom of an annular space (64) of the second sheave (40) and an opposite end connected to a fixed location with reference to the first sheave (12). In the illustrated embodiment, the fixed end of the spring (80) rests against an optional protector (82), itself resting on a stop (84) held by a C-clip (86) connected to the mounting tube (38). The protector (82) and the stop (84) can be integrated into a single part to further simplify the assembly. The spring (80) is pre-loaded in compression and/or in torque, depending on the needs. The purpose of the spring (80) is to create a return force urging the second sheave (40) towards the first sheave (12).

In the improved driven pulley (10), the follower (70) are rollers and the mounting supports (72) are part of a roller mounting unit (74) that includes an annular member (76). The annular member (76) fits over an area (62) at the top of the outer sleeve portion (60) of the second sheave (40). Both parts are removably connected together by means of a plurality of bolts (78), or the like, inserted in corresponding holes made through the annular member (76) and in corresponding threaded holes in the second sheave (40).

Figure 4:
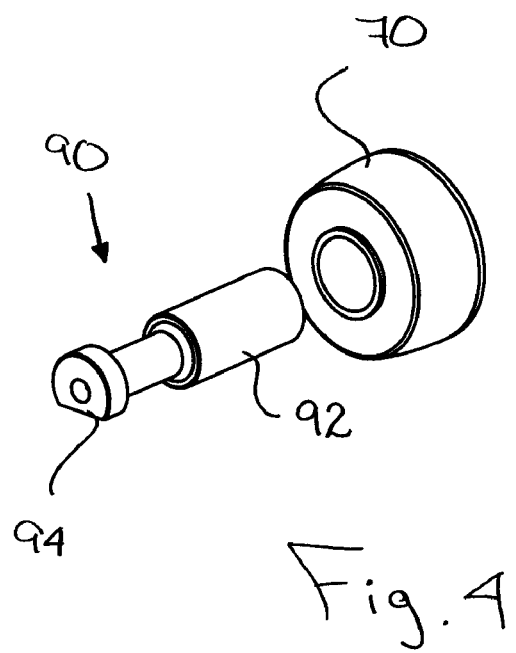
FIG. 4 is an isometric view of one roller and its corresponding axle, as used in the driven pulley shown in FIG. 1.

Each roller (70) is mounted on an axle (90). As best shown in FIG. 4, one end of the axle (90) comprises a portion (92) over which the roller (70) is mounted, and an opposite cylindrical end (94) with a flattened side. The inner portion of the axle (90) snugly fits into a corresponding radially-oriented recess (96) in the annular member (76). The recess (96) has an enlarged area (98) near the inner periphery of the annular member (76) in which the flattened cylindrical end (94) fits. The flattened side of the cylindrical end (94) is such that the inner portion of the axle (90) that is in the recess (96) is within the boundaries of the recess (96), including on the opened side. This way, the side face of the annular member (76) does not have any protruding part. The outer tip of the enlarged area (92) of the axle (90) will simply rest against the end of its mounting support (72), as shown in FIG. 5. Optionally, as shown in FIGS. 1 and 2, a washer (100) is provided between the roller (70) and the interior of the mounting support (72) to prevent a direct contact between them.

Generally, each roller (70) includes an integrated bearing or a bushing to reduce friction. Also, the shape of the roller (70) can be slightly conical to follow the curvature of the ramps (36). It can further include a damping element somewhere between the axle (90) and the surface of the roller (70). The roller (70) can be made of a plastic material. These features, either alone or in combination, reduce the noise coming from the driven pulley (10) during operation.

In use, the outer sleeve portion (60) of the second sheave (40) of the illustrated driven pulley (10) is housed in the internal enclosure (32) of the first sheave (12). Each roller (70) engages a corresponding ramp (36). The torque, if transmitted as a force coming from the drivebelt, has one half going through the first conical wall (22) and a second half going through the second conical wall (52). The torque in the first sheave (12) is directly transmitted to the main shaft by the bracket portion (30), the sleeve portion (34) and then the mounting tube (38). The other half of the torque, in the second sheave (40), is transmitted to the outer sleeve portion (60), the roller mounting unit (74) and then the rollers (70). The rollers (70) transmit the torque in their turn to the ramps (36), that being added to the first torque half.

As can be appreciated, the roller mounting unit (74) greatly simplifies the assembling or even the replacement of the rollers (70) in a driven pulley (10).

It must be understood that the present invention is not limited to this precise embodiment and that various changes and modifications may be effected therein without departing from the scope of the present invention defined by the appended claims For instance, although the driven pulley is shown as having removable ramps, it is possible to construct a driven pulley with ramps made integral with the first sheave. Similarly, the roller mounting unit can be used in a driven pulley having a different design. The flattened cylindrical end of the axle can be replaced by an end having another shape, such as rectangular or else. The roller receiving portion of each axle is not necessarily having a larger diameter that another portion or portions of the axle.

What is claimed is:

1. A driven pulley for a continuously-variable transmission (CVT), the driven pulley including a first sheave and a second sheave coaxially disposed and having mutually-opposed front side faces defining between them a belt-receiving groove, the first sheave having at least two ramps symmetrically-disposed with reference to the rotation axis, the second sheave having at least two rollers and corresponding mounting supports symmetrically disposed with reference to the rotation axis of the driven pulley, each roller being in engagement with a corresponding one of the ramps, the mounting supports being rigidly connected to an annular member, itself removably connected to the front side face of the second sheave, the annular member being perpendicularly-oriented and coaxially-disposed with reference to the rotation axis of the driven pulley, the rollers being held in the mounting supports by corresponding axles around which they are coaxially mounted, each axle having a first end inserted in a corresponding radially-oriented recess provided on a side face of the annular member facing the second sheave, and a second end supported by the corresponding mounting support, the first end of each axle engaging the front side face of the second sheave.

2. The driven pulley as defined in claim 1, wherein the annular member is bolted to the front side face of the second sheave.

3. The driven pulley as defined in claim 1, wherein the mounting supports and the rollers are disposed at an outer periphery of the annular member, each mounting support being substantially U-shaped.

4. The driven pulley as defined in claim 3, wherein the first end of each axle includes an enlarged portion inserted in a corresponding enlarged section provided on the corresponding recess.

5. The driven pulley as defined in claim 4, wherein the enlarged portion of each axle is cylindrical, the cylindrical portion being flattened to keep the axle within boundaries of the corresponding recess.

6. A roller mounting unit for a driven pulley of a continuously-variable transmission (CVT), the driven pulley including two sheaves, the roller mounting unit including:

a plurality of rollers;

a plurality of axles, one for each roller, each axle having opposite first and second ends and a roller-receiving portion around which a corresponding one of the rollers is mounted, the first end of each axle including an enlarged portion;

an annular member having opposite first and second side faces, the first side face having a plurality of radially-oriented recesses, one for each axle, that are symmetrically disposed on the first side face, each recess having an enlarged section removably receiving the enlarged portion of the first end of a corresponding one of the axles;

a plurality of radially-oriented individual mounting supports, one for each axle, that are in registry with a corresponding one of the recesses, each mounting support having opposite first and second ends between which are located a corresponding one of the rollers, the first end of each mounting support being connected to an outer periphery of the annular member and the second end of each mounting support being configured and disposed to hold the second end of a corresponding one of the axles; and a plurality of fasteners to removably connect the annular member to one of the sheaves of the driven pulley with the first side face of the annular member being in engagement with said sheave, thereby holding the first ends of the axles into the enlarged sections of the recesses.

7. The roller mounting unit as defined in claim 6, wherein the annular member is bolted to said sheave.

8. The roller mounting unit as defined in claim 7, wherein the first end of each axle is cylindrical, the enlarged portion of the first end being flattened to keep the axle within boundaries of the corresponding recess.

9. A method of supporting rollers in a driven pulley of a continuously-variable transmission (CYT), the method including:

inserting rollers around corresponding axles, each axle having an inner end and an outer end;

inserting an enlarged portion of the inner end of the axles in corresponding enlarged sections of radially-extending recesses that are symmetrically disposed in an annular member, the outer end of each axle being supported at the end of a corresponding individual mounting support projecting radially outwardly from the annular member in front of the corresponding recess; and removably fastening the annular member to a sheave of the driven pulley, the inner end of the axles being retained in the recesses by engaging the annular member with the sheave of the driven pulley.

10. The method as defined in claim 9, wherein removably fastening the annular member includes bolting it to the sheave of the driven pulley.

* * * * *